(12) United States Patent
Grafton

(10) Patent No.: US 6,543,240 B2
(45) Date of Patent: Apr. 8, 2003

(54) COMBINATION AIRCONDITIONING/HEAT SYSTEM FOR EMERGENCY VEHICLE

(76) Inventor: William W. Grafton, 1619 Park Commerce Ct., St. Cloud, FL (US) 34769

( * ) Notice: Subject to any disclaimer, the term of this patent is extended or adjusted under 35 U.S.C. 154(b) by 0 days.

(21) Appl. No.: 09/909,255

(22) Filed: Jul. 20, 2001

(65) Prior Publication Data

US 2003/0014992 A1 Jan. 23, 2003

(51) Int. Cl.[7] ................................................ F25B 41/00
(52) U.S. Cl. ........................................ 62/214; 62/244
(58) Field of Search .................................. 62/244, 214

(56) References Cited

U.S. PATENT DOCUMENTS

| | | |
|---|---|---|
| 2,193,836 A | 3/1940 | Winther |
| 2,308,079 A | 1/1943 | Henney |
| 2,780,077 A | 2/1957 | Jacobs |
| 2,884,768 A | 5/1959 | Gould |
| 3,844,130 A | 10/1974 | Wahnish |
| 3,984,224 A | 10/1976 | Dawkins |
| 4,193,271 A | 3/1980 | Honigsbaum |
| 4,531,379 A | 7/1985 | Diefenthaler, Jr. |
| 4,672,296 A | 6/1987 | Griffin |
| 4,785,227 A | 11/1988 | Griffin |
| 4,903,503 A | * 2/1990 | Meckler ...................... 62/238.3 |
| 5,183,102 A | * 2/1993 | Clark .......................... 165/48.1 |
| 5,307,645 A | * 5/1994 | Pannell ....................... 454/144 |
| 5,462,113 A | * 10/1995 | Wand .......................... 165/140 |
| 5,538,075 A | * 7/1996 | Eubank et al. ............... 165/125 |
| 5,666,813 A | * 9/1997 | Brune ........................... 62/510 |
| 5,693,382 A | * 12/1997 | Hamada et al. ............. 359/350 |
| 5,884,696 A | 3/1999 | Loup |
| 5,975,202 A | * 11/1999 | Grandi ....................... 165/48.1 |

OTHER PUBLICATIONS

Patent Application Publication Pub. No.: US 2001/0027660 A1, Invento: Moffa.*
Pub. No.: US 2001/0027660 A1, Applicant–Moffa, Date of application May 2001.*

* cited by examiner

Primary Examiner—William C. Doerrler
Assistant Examiner—Mohammad M. Ali
(74) Attorney, Agent, or Firm—Julian C. Renfro, Esq.

(57) ABSTRACT

An air conditioning arrangement for an emergency vehicle or the like including an evaporator unit comprising closely spaced first and second tubing arrays, with each array being operably associated with a respective refrigerant compressor. The tubing of each array is formed into coils involving a number of essentially parallel tubing runs connected by curved end members, with substantial portions of the tubing being provided with fins. A low voltage blower is positioned to cause air to be pulled across the tubing of the first and second tubing arrays and between the fin members.

21 Claims, 6 Drawing Sheets

COMBINATION AIRCONDITIONING/HEAT SYSTEM FOR EMERGENCY VEHICLE

BACKGROUND OF THE INVENTION

1. Field of the Invention

This invention relates generally to the air conditioning of an emergency vehicle or the like and more particularly to the cooling or heating of the rear area of the vehicle, occupied by an injured person and emergency personnel.

2. Description of the Prior Art

A study of the prior art reveals that various methods and arrangements have been developed to air condition emergency vehicles or the like. There are two principal refrigeration type air conditioning systems currently employed in such vehicles, with the first of these being an air-conditioning system in which the Freon compressor is driven by the vehicle's engine. The second is a separate system which is operable when the vehicle may be parked and employing a motor-driven compressor, powered by an outside ac line voltage source or the equivalent.

If there is no alternating current line voltage available when the vehicle is parked, the vehicle engine can be started and idled so that the rear area can be air conditioned. As an alternative to this, a small separate generator powered by gasoline or Diesel engine can be utilized.

As one example of prior art devices, the Dawkins Patent No. 3,984,224 entitled "Air Conditioning System for a Motor Home Vehicle or the Like," is concerned;with cooling both the front passenger area as well as the rear living area. This patentee describes that he uses over-sized condensers mounted on the roof of his vehicle so that both the front and rear areas of the vehicle can be cooled without necessitating the use of separate air conditioning systems. Although Dawkins describes that he may use either a compressor driven by the vehicle's engine or an ac line voltage source driving a 110 volt electric motor driven compressor, this patentee shows no recognition of the fact that his evaporators can be disposed in a compact arrangement. Also, his roof-mounted condensers are a considerable disadvantage when the vehicle is brought near a low overhang or low roof.

The prior art also teaches the use of certain combinational schemes for the providing of cooled or heated air to a vehicle. Although not designed for use with an emergency vehicle, the Pannell U.S. Pat. No. 5,307,645 nevertheless teaches a dual stage system utilizing interleaved evaporator coils. This patentee describes that Compressor Q1 is a first stage compressor whose suction port is connected to the evaporator coil 52, with the suction port of the Compressor Q2, the second stage compressor, being connected to the evaporator coil 54. Pannell utilizes a single evaporator fan 49 which induces the return air R to flow through the evaporator unit 30 depicted in Pannell's FIG. 4, in which unit, both evaporator coils are disposed. However, this patentee exhibits no-recognition of the use of an evaporator unit in which the separate evaporator coils (tubing arrays) of two different, separately operable air conditioning systems are placed in a contiguous arrangement such as to make possible the use of a single blower.

The Loup U.S. Pat. No. 5,884,696 teaches a triple heat exchanger occupying less space than the combination of two separate heat exchangers. Three fluids are dealt with, involving air for delivery into the cabin of a vehicle; a refrigerant fluid such as to pass from the liquid to the gaseous state in the heat exchanger by absorption of heat; and a hot fluid which yields heat to the other two fluids. However, this patentee exhibits no recognition of an arrangement in which a single, compact evaporator unit could be advantageously employed with two alternatively operable air conditioning units.

SUMMARY OF THE INVENTION

A combinational air conditioning arrangement for an emergency vehicle or the like in accordance with this invention is designed to be used with a compressor driven by the vehicle's engine or, alternatively, by a compressor driven from a suitable 110 volt source. My novel system comprises an evaporator supporting means, and a novel air conditioner evaporator unit mounted upon the supporting means. This novel evaporator unit involves closely spaced first and second tubing arrays or cores, with each array being operably associated with a respective refrigerant compressor. The tubing of each array is formed into coils involving a number of essentially parallel tubing runs connected by curved end members. A third tubing array is operatively positioned alongside the evaporator involving the first and second tubing arrays, with this third tubing array being adapted to carry a heated liquid on selected occasions.

Advantageously the first and second tubing arrays are interconnected by a multiplicity of fin members of thin, thermally conductive material, and in many instances, the fins are constructed so as to include the third tubing array as well.

As will be understood by those skilled in the art, the first and second tubing arrays operate independently and alternatively, with refrigerant actively flowing through one or the other of the tubing arrays at a given time.

It is most important to note that I utilize blower means common to all three tubing arrays, with this blower means operative on low voltage, typically 12 volts dc. This is to say, even though the vehicle is parked, and the Freon compressor powered by 110 volts ac is in operation, the functioning of the low voltage blower means remains unaffected.

It is a primary object of my invention to provide a compact evaporator unit primarily constructed for use in a space-saving manner in an emergency vehicle, with this evaporator unit featuring closely spaced first and second tubing arrays or cores, each operably associated with a respective compressor, with a third tubing array operatively positioned alongside the first and second tubing arrays and adapted to carry a heated liquid on selected occasions.

It is another object of my invention to provide a system wherein the several fans relating to the air conditioning system, as well as the air circulating blower are, quite advantageously, each driven by a 12 volt dc system.

It is yet another object of my invention to provide a single thermostat for the operation of two independent heating and cooling systems, thus eliminating unnecessary wiring and minimizing space requirements in the rear, patient carrying compartment of the vehicle.

These and other objects, features and advantages will become more apparent as the description proceeds.

DETAILED DESCRIPTION

Figure 1:
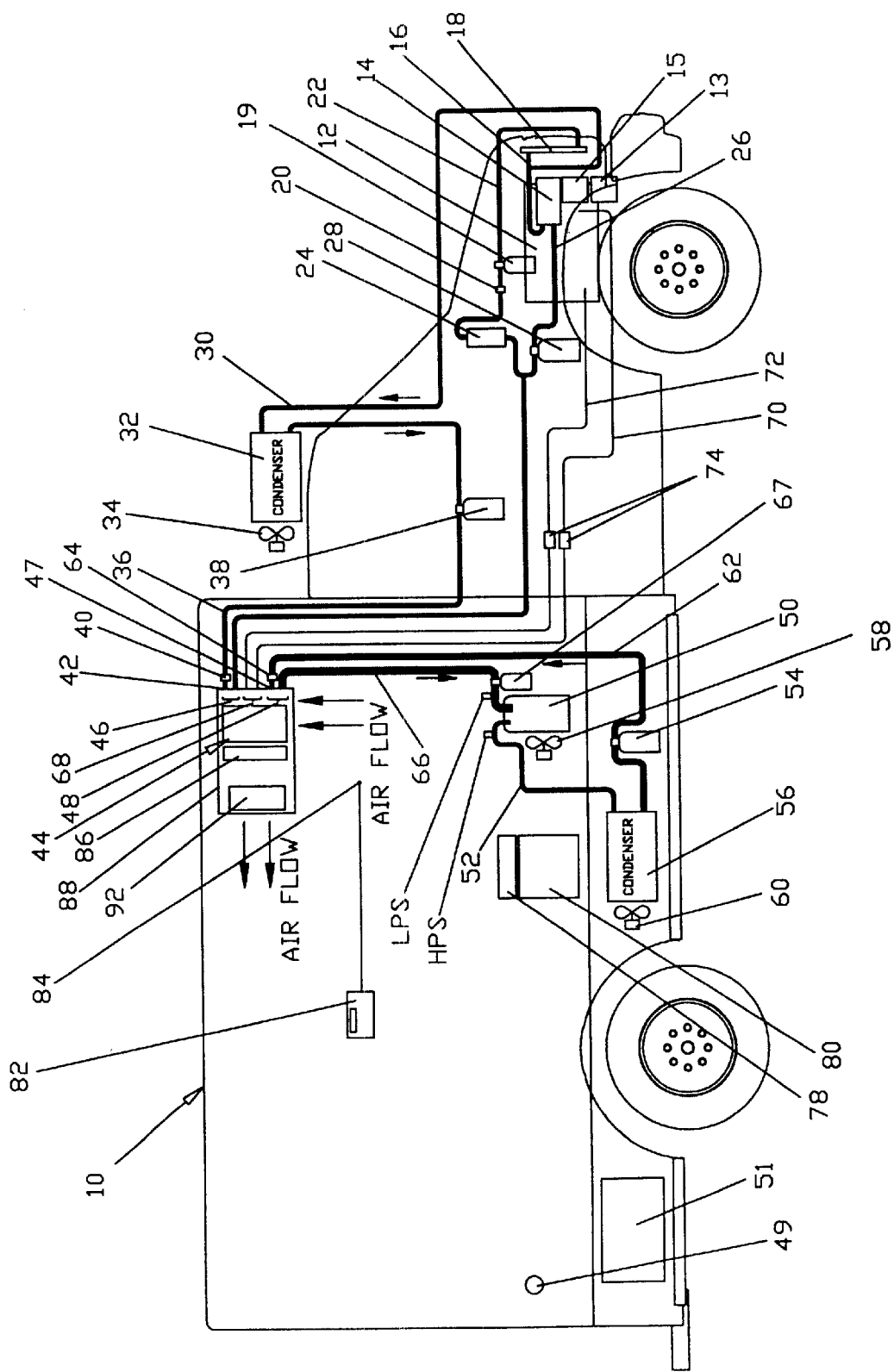
FIG. 1 is a side elevational view of an emergency vehicle, with large portions cut away to reveal some of the principal aspects of my invention.

With initial reference to FIG. 1 it will be noted that. I have depicted a typical emergency vehicle 10, with the side portion sectioned away in order to illustrate the location of the compact. evaporator unit 44 that I utilize, and the several components that cooperate to cause this novel evaporator unit to function in the intended manner.

It will be observed that I have schematically indicated engine 12 in the front of the vehicle for providing driving power, with which is associated an alternator 13 for providing 12 volt dc power at numerous locations in the vehicle. Also to be noted is a Freon compressor 14 suitably mounted so as to be driven in rotation during operation of the engine 12.

It will later be explained that I may utilize in the vehicle a 110 volt generator driven by a small gasoline-powered, Diesel-powered or propane-powered engine. In addition to that, I may, as a further option, utilize a belt-driven 110 volt generator 15 mounted alongside the engine 12, so as to bring about the generation of ac power for the vehicle when the engine is running, should such ac power be needed.

The Freon compressed by the compressor 14 is delivered through a fluid connection 16 to the condenser 18 located in the front of the vehicle. Thereafter the compressed Freon may optionally pass through a dryer 19 and then to an expansion device 20 located in fluid connection 22 to the evaporator 24. The purpose of these components is for supplying cooling to the part of the vehicle occupied by the driver. The Freon having expanded is now delivered back to the suction side of the compressor 14 by a fluid connection 26. In many instances an accumulator 28 is utilized in connection 26 for preventing any droplets of liquid entering the suction side of the compressor 14.

It is to be understood that the compressed Freon output of the engine driven compressor 14 is also delivered by fluid connection 30 to the condenser 32 associated with the cooling of the rear or patient-carrying compartment of the vehicle. Not only is it important for an injured person as well as the caregiver or attendant to be kept at a desirable temperature, but also it is important to prevent certain lifesaving drugs as well as sensitive equipment carried aboard the vehicle in a suitable environment. The condenser 32, also known as the auxiliary condenser, may be located on the roof of the vehicle directly above the driver, or it may be mounted on the underside of the vehicle.

As one option, a single condenser may be utilized in conjunction with the cooling of the cab of the vehicle as well as the rear, patient-carrying part of the vehicle. As another option, the condenser 32 may be stacked with the condenser 56, later described in conjunction with the 110 volt system carried aboard the vehicle. In all instances the condensers must be cooled, and from FIG. 1 it will be noted that the condenser 32 is shown being cooled by a fan 34, designed to operate on 12 volts dc.

A fluid connection 36 carries the output of condenser 32 via a dryer 38 to expansion device 40 and to an inlet 42 of one of the tubing arrays or coils contained in the novel evaporator unit 44. In this instance the tubing array of the evaporator unit 44 is tubing array 46, which is associated with the cooling of the rear or passenger area of the emergency vehicle when the vehicle is underway and the compressor 14 is serving to provide compressed Freon for air conditioning purposes. I typically use Freon R-134A refrigerant in the tubing array or coil 46, but I am not to be limited to this.

Figure 2:
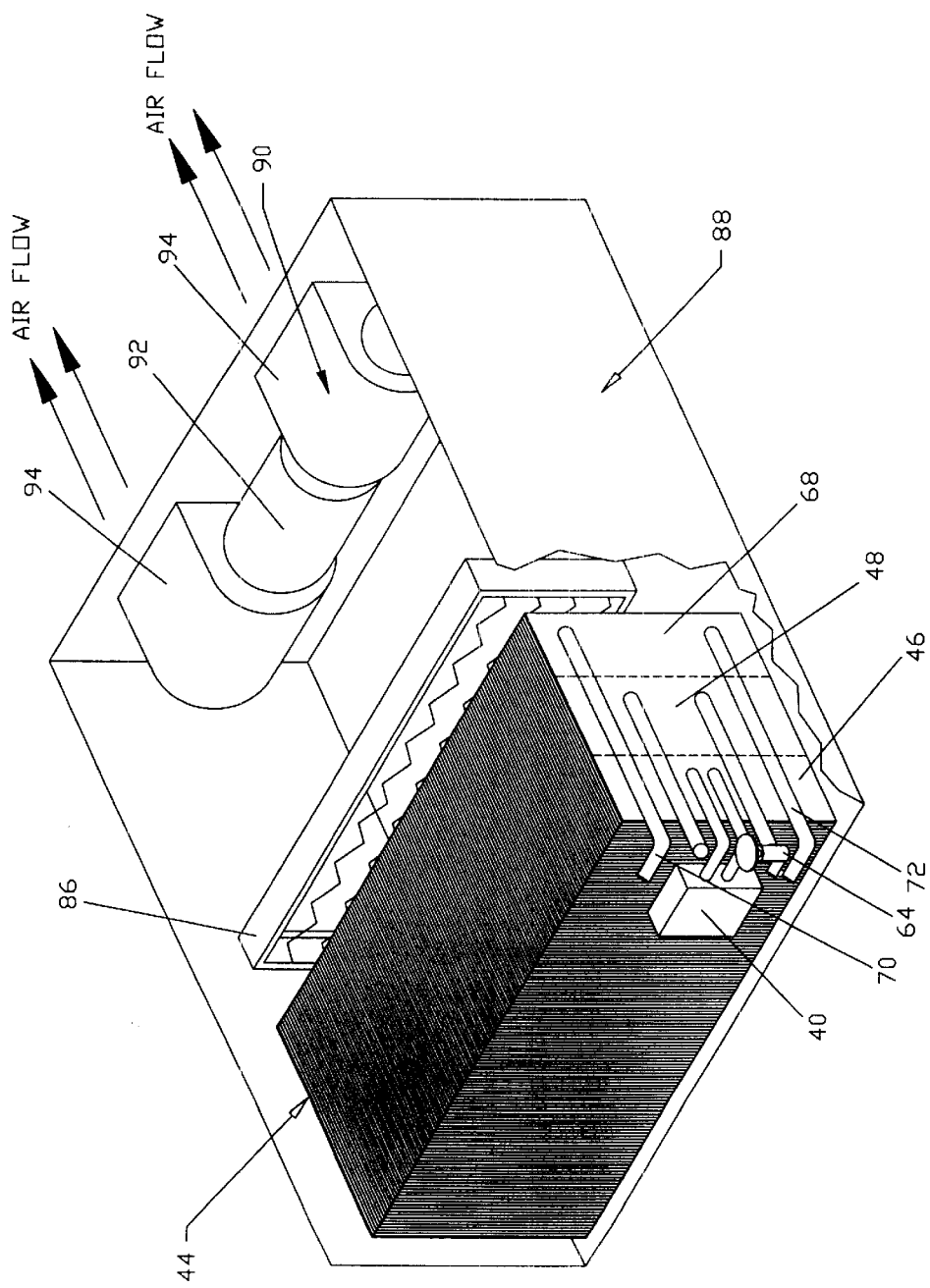
FIG. 2 is a view of the distribution unit utilized for providing cooled (or heated) air to the rear compartment of an emergency vehicle, with the novel evaporator unit I utilize forming an important part of the distribution unit.

As will soon be more apparent, the tubing array 46 and the other components of the novel evaporator unit 44 form an important aspect of the present invention, with these components being visible in greater detail in FIG. 2 and certain additional figures. During the time the-tubing array 46 is operative to provide cooling, it is not usual that-any 110 volt electrical power is being utilized for air-conditioning purposes. However, there are instances in which it is possible for the engine driven compressor 14 as well as a compressor powered by 110 volts to be jointly operative.

Continuing with a consideration of FIG. 1, it will be noted that I have provided a Freon compressor 50 designed to run on 110 volts ac. The electric power to the compressor 50 may be supplied from any of three separate sources, with these including power supplied by an extension cord to the quick disconnect 49 located on the exterior of the vehicle, when the vehicle has been parked alongside an emergency entrance to a hospital, for example. This is sometimes referred to as "shore power." Other sources of 110 volt power to the compressor 50 may include the previously-mentioned 110 volt generator 15 driven in rotation by the engine 12, or by a 110 volt generator 51 driven by the previously-mentioned small gasoline-powered, Diesel-powered or propane-powered engine mounted in a rear portion of the vehicle 10. By supplying the compressor 50 and certain other electric components with 110 volts ac, the injured passenger as well as the caregiver, the lifesaving drugs and the sensitive equipment carried aboard the vehicle can be maintained at a suitable temperature in the rear compartment of the vehicle, typically at such time as when the emergency vehicle has been parked.

As will be further noted from FIG. 1, a fluid connection 52 enables the compressed Freon to be delivered from the compressor 50 to the inlet of condenser 56, with a high pressure switch designated HPS being deployed in fluid connection 52. It is to be observed that a fan 58 is designed to keep the compressor 50 from overheating, and a fan 60 is utilized for cooling condenser 56. Both of these fans as well as the other fans utilized on the vehicle are advantageously designed to operate on 12 volts dc for the purpose of saving space and for easy maintenance.

Fluid connection 62 delivers the output from the condenser 56 via a dryer 54 to an expansion device 64 and thereafter to the inlet 47 of the respective tubing array 48 of the novel evaporator unit 44. The tubing array 48 is obviously concerned with providing a suitable temperature in the rear compartment of the vehicle, usually but not always, when the vehicle is parked. The outlet from this tubing array 48 is delivered by fluid connection 66, typically via an accumulator 67 and a low pressure switch LPS back to the suction side of the compressor 50.

With regard to FIG. 2, it is to be seen that my novel evaporator unit 44 also includes a tubing array 68 through which engine coolant circulated by the operation of the engine 12 is caused to flow through the evaporator unit 44 when heating of the rear compartment of the vehicle is desired. The heated coolant fluid is enabled to circulate through the tubing array 68 by means of fluid connections 70 and 72, visible in FIG. 1 as well as in FIGS. 2 through 4, with it being illustrated in FIG. 1 that heater control valve 74 is utilized to control the amount of heat delivered to the tubing array 68. The control valve 74 is caused to operate by a thermostat, as will be explained in greater detail hereinafter.

With continuing reference to FIG. 1, it will be noted that I have indicated the approximate placement of an ac to dc converter 78 utilized for providing 12 volts dc during the time the emergency vehicle is parked and "shore power" is being primarily utilized for providing cooling (or heating) to the interior of the vehicle. Also depicted in FIG. 1 is an electrical control box 80, which provides all of the operational controls of the system, including the 12 volt and the 110 volt components.

Also depicted in FIG. 1 is an interior thermostat 82, which monitors the interior temperature through a remote sensor 84. Based on the temperature selector setting, the interior thermostat 82 controls the speed of the 12 volt dc blower 92 visible in FIG. 2. This blower is utilized in conjunction with the novel evaporator unit 44 as well as the operation of compressor 14, the 110 volt ac compressor 50 and the condenser fans 34 and 60. On occasion, the flow of heated fluid to the heater core 68 is also controlled by the thermostat.

With particular reference to FIG. 2, it will be noted from this perspective view that my novel evaporator unit 44 forms a part of what I refer to as a distribution unit 88. The evaporator unit 44 is constituted by the previously-mentioned first and second tubing arrays or coils 46 and 48, which will be seen in FIG. 2 to reside in a closely spaced relationship adjacent one end of the unit 44. It is to be understood that the evaporator coil or array 46 is typically charged with a refrigerant known as R-134A, although I am not to be limited to this refrigerant. The refrigerant compressed by engine driven compressor 14 is caused to expand through the first evaporator array 46 and as should now be amply clear, to provide a suitable amount of cooling for the rear area of the vehicle while the vehicle is underway.

Figure 3:
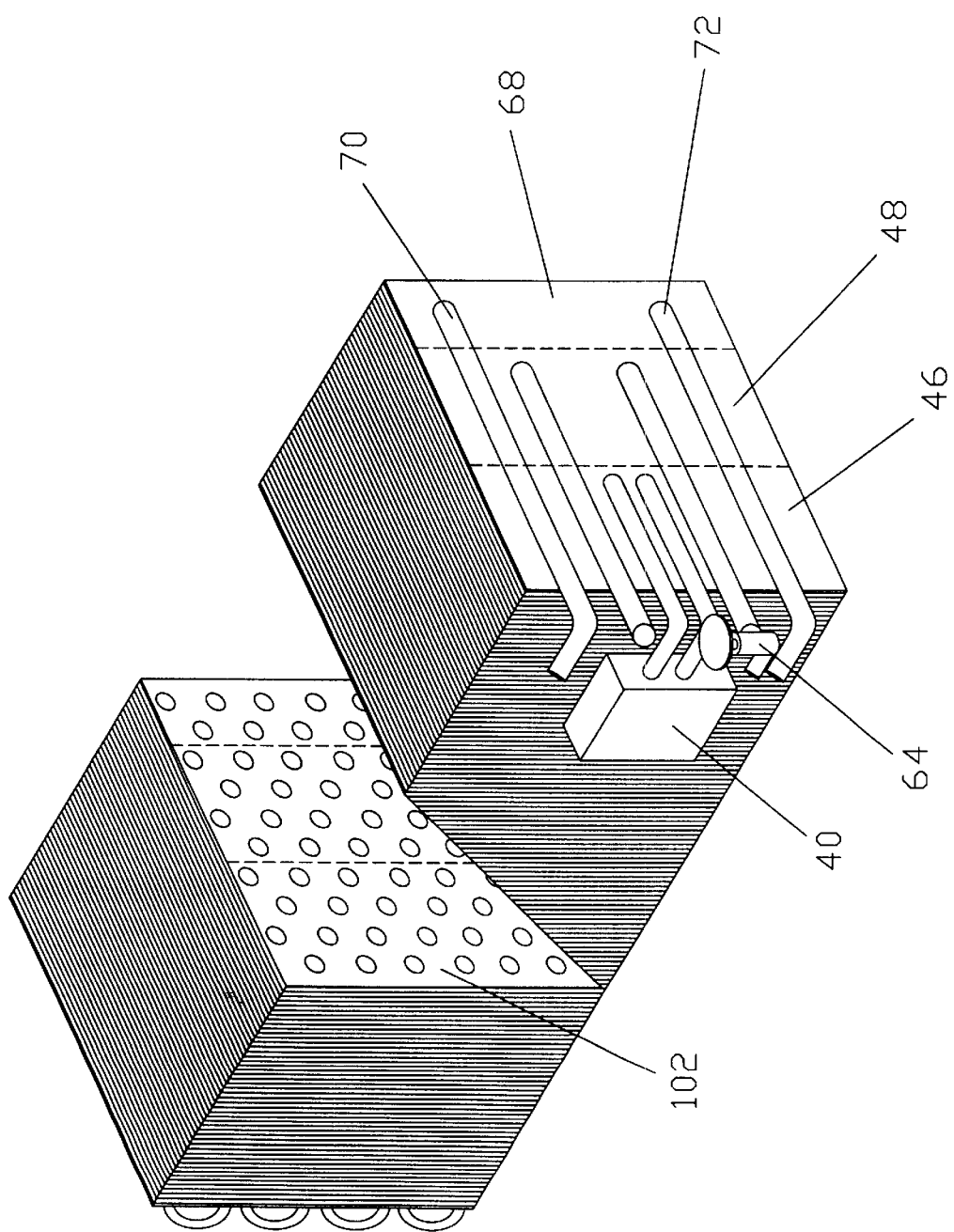
FIG. 3 is a view generally similar to FIG. 2 but to an enlarged scale so as to reveal additional aspects of my novel evaporator unit, including the fact that the two separate tubing arrays are constituted by longitudinally-extending tube members which are finned together, and in some instances finned with the longitudinally-extending components of the heat coils.
Figure 4:
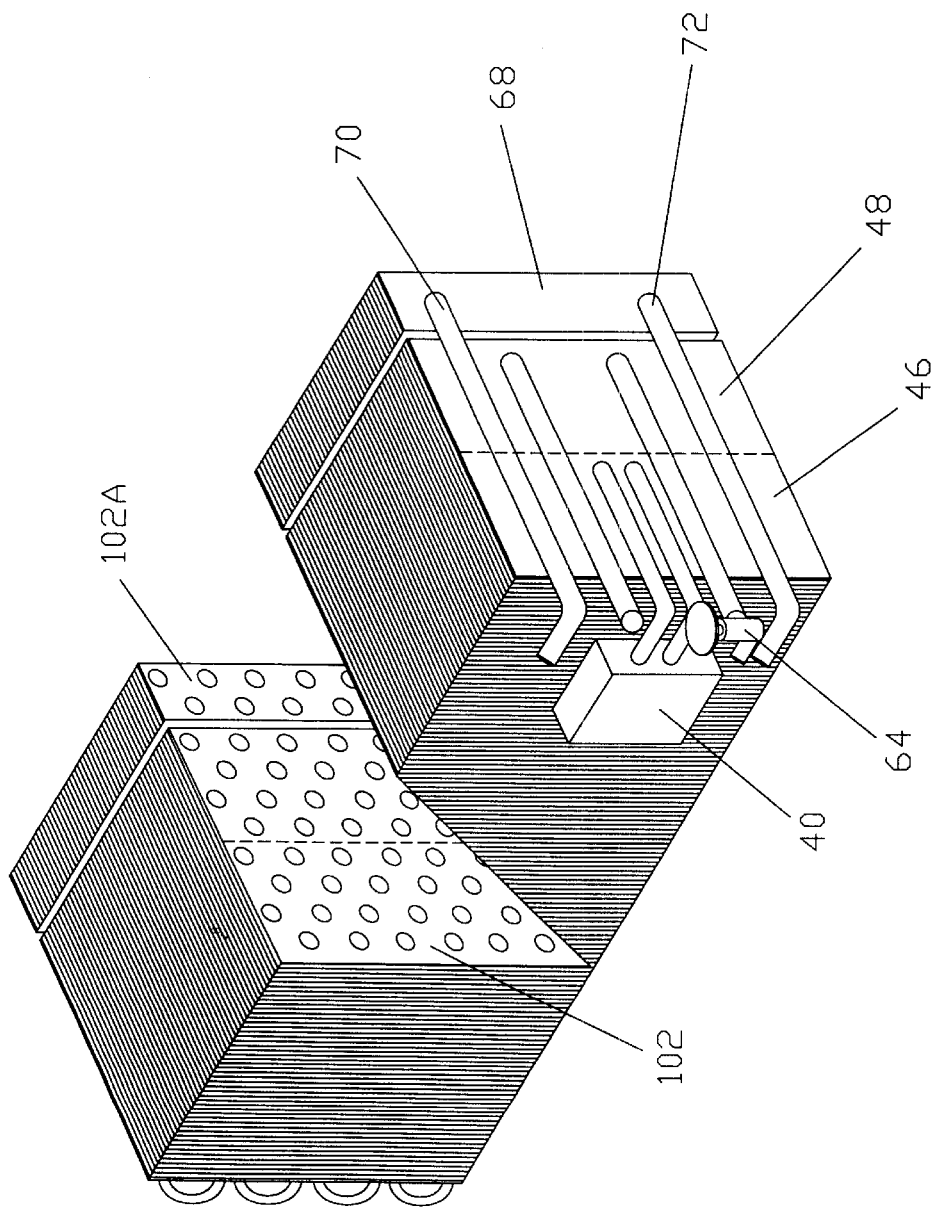
FIG. 4 is a view similar to FIG. 3, but revealing that the heat coils may be finned separately from the evaporator coils.

FIGS. 2 through 4 clearly reveal that a second tubing array or coil 48 is located closely adjacent the first tubing array or coil 46, and through the tubing array or coil 48 a refrigerant such as R-22 or some other suitable type of Freon is caused to expand during the time the compressor 50 powered by a 110 volt ac motor is in operation. The evaporation taking place in evaporator coil 48 is typically occurring when the vehicle is parked.

Also to be noted in FIG. 2 is the fact that I dispose the previously-mentioned additional coil or tubing array 68 in a parallel relationship with arrays or coils 46 and 48. As will be readily understood, the tubing array 68 is concerned with making heat available, when such is desired, by virtue of the circulation therethrough of liquid coolant originating in the radiator of the engine 12.

In the interests of compactness, I dispose the first and second tubing arrays or coils 46 and 48 closely together in a parallel relationship, with the heater coil 68 disposed close to the tubing array 48. These details will clearly be seen from a somewhat larger depiction of the tubing arrays appearing in FIG. 3.

In FIG. 2 it will additionally be seen that I have illustrated a heat strip or filament array 86, which functions to supply heat to the rear compartment of the vehicle when heat is required during the time that the engine 12 is not running to bring about the circulation of heated fluid through the heater coil or core 68. The heat strip 86 is supplied with 110 volts ac when heating is required.

With further regard to the distribution unit 88 depicted in FIG. 2, it is to be noted that I utilize a blower unit 90 disposed in the part of the distribution unit concerned with supplying cooled (or heated) air to the rear or patient-carrying compartment of the vehicle. It is to be understood that the blower unit 90 involves a 12 volt dc motor 92 located between a pair of blower fans 94. Preferably the motor 92 is operative on a shaft parallel with and connected to the shafts upon which the blower fans 94 are located. The rotative direction of the motor 92 and the fans is such that air is pulled through the fins of the several tubing arrays, to provide proper distribution of cooled (or heated) air to all portions of the rear compartment of the vehicle, in a manner represented in FIG. 1 by the pair of rearwardly directed arrows.

It is most important to understand with regard to this invention that the blower motor 92 is powered by low voltage, typically 12 volts dc. Because of the advantageous arrangement I utilize, including the use of the ac to dc converter 78, the blower 92 as well as the 12 volt fans 34, 58 and 60 are operational on low voltage direct current. This is true whether the vehicle is underway, or parked with the 110 volt ac motor driving the compressor 50.

It is to be understood that the blower unit 90 depicted in FIG. 2 is arranged to deliver cooled (or heated) air in a direction toward the upper right hand corner of this figure, meaning that ambient air is drawn between the fins 102 and through the several tubing arrays forming the evaporator unit 44.

Turning now to FIG. 3, it will be noted that this figure bears a relationship to the evaporator unit depicted in FIG. 2, but with FIG. 3 being to a larger scale in order to emphasize the fact that I utilize fins 102 common to at least the tubing arrays 46 and 48, which contain Freon R-134A and Freon R-22, respectively. In many instances I utilize fins common to all three cores or tubing arrays, including tubing array 68 associated with providing heat to the rear or patient-carrying compartment. The fins are metallic, typically made of aluminum, with the spacing of the fins in some instances being 12 per inch. Obviously I am not to be limited to any particular dimensions in accordance with this invention.

It is to be understood with regard to FIG. 3 that the tubing arrays 46 and 48 separately concerned with the circulation of Freon through the evaporator unit 44 are spaced quite closely together, with the heat providing core 68 located closely adjacent the tubing array 48. Also visible in FIGS. 2 and 3 is the expansion device 40 intended for use with the compressor 14 and the tubing array 46, which expansion device is preferably operative on a pressure differential. Also visible in these figures is the expansion device 64 utilized in conjunction with the compressor 50 driven by 110 volts ac, which is different from the expansion device 40 in that the expansion device 64 is operative on a temperature differential.

With reference to FIG. 4, it will be seen that this figure resembles FIG. 3, but differs in that it reveals the tubing array 68 equipped with fins 102A that are slightly separated from the fins 102 common to tubing arrays 46 and 48. It is the obvious purpose of FIG. 4 to show that I am not limited to fins common to tubing arrays 46, 48 and 68.

Figure 5:
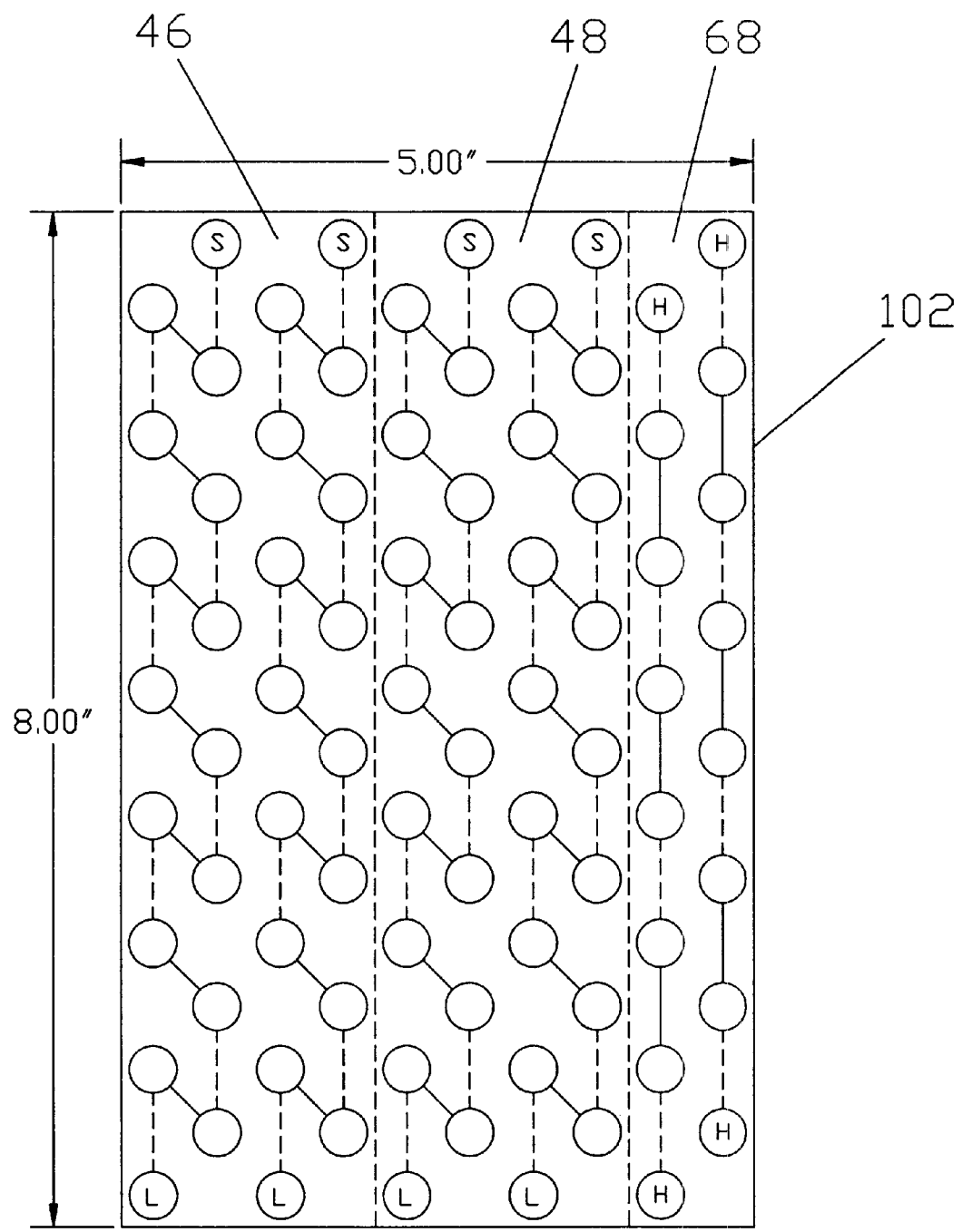
FIG. 5 is a view revealing in cross section, a somewhat simplified representation of the separate tubing portions that constitute each of the separate tubing arrays of my novel evaporator unit.

With reference now to FIG. 5, it will be seen that I have shown in cross section, portions of typical tubing arrays of an evaporator unit in accordance with this invention. It is well known in the art to utilize relatively soft copper tubing in the creation of the tubing arrays of evaporator units. In many instances, the tubing has a wall thickness of 0.013 inches, with an outer diameter of ⅜ inch. However, I am obviously not to be limited to any particular sizes or dimensions.

It will be noted that on the left hand side of FIG. 5 are a series of circles representing the tubing array 46 concerned with the circulation of the Freon compressed by the engine driven compressor 14, but it is to be understood that this is a somewhat simplified version, with there likely being additional tubing components constituting the tubing array 46. FIG. 5 should be viewed with reference to FIGS. 3 and 4 inasmuch as the numerous circles depicted in FIG. 5 are intended to represent the elongate, relatively straight tubes extending from one end of the evaporator unit 44 to the other. The ends of these relatively straight tubes are interconnected in an appropriate and operable manner by the use of a series of 180° elbows.

In approximately the center of FIG. 5 are a series of circles representing the tubing array 48 concerned with the circulation of the Freon compressed by the compressor 50 driven by a 110V motor, with it likewise being true that in the usual instance, there are more components concerned with the tubing array 48 than are depicted in FIG. 5.

On the right hand side of FIG. 5 are depicted a series of circles representing the paths of circulation taken by the hot water from the radiator of the vehicle's engine when the vehicle is underway and heating is desired for the occupants of the rear or patient-carrying portion of the vehicle.

Returning to a consideration of tubing array 46, it will be noted that the tubing components of one part of this tubing array are disposed in a symmetrical yet offset relationship with the tubing components of another part of this same tubing array. It will be further noted that adjacent pairs of circles in some instances are connected by dashed lines, but in other instances, the circles are connected by solid lines. By this arrangement in tubing array 46 I am intending to connote that the dashed lines represent the 180° elbows on the far side of the evaporator unit that are utilized to interconnect respective ones of the straight tubing portions of tubing array 46. In other words, the dashed lines serve to represent the elbows located below the plane of the paper. This is in contrast with the utilization of the solid lines extending between adjacent pairs of circles, which solid lines are intended to connote the 180° elbows located on the near side of the evaporator unit, or in other words, above the plane of the paper.

The use of dashed lines and solid lines in connection with tubing array 48 serves a like purpose. Similarly, the use of dashed lines and solid lines in tubing array 68 concerned with heating is intended to call out the locations of the elbows on the far side and the near side of the unit, respectively.

It will be noted that the uppermost circles of the tubing array 46 and of the tubing array 48 contain the letter S, with this connoting the fact that this is the suction side of each tubing array, whereas the bottom circles of these two tubing arrays contain the letter L, representing liquid. It is obvious to those skilled in this art that during the process of expanding through the evaporator unit, the refrigerant takes on heat in changing from the liquid phase to the gaseous phase, and in so doing, serving to remove heat from the area of the vehicle that is desired to be cooled. In order to enhance the operation of the evaporator components, I prefer to use in each line, in the vicinity of the location of the letter L, a rotation-causing device. These small devices, known as "turbulators," cause desirable turbulence in the Freon, which in turn causes an enhanced heat flow across the fins.

It is to be understood that the separate parts of tubing array 46 are operatively connected with the previously-mentioned expansion valve 40, with such connections being accomplished by the use of suitable header tubes located on an external part of the unit. Likewise, it is to be understood that the separate parts of tubing array 48 are operatively connected with the previously-mentioned expansion valve 64, with such connections being accomplished by the use of suitable header tubes located on an external part of the unit.

Returning now to a further consideration of FIG. 3, it was earlier mentioned that the various parts of the tubing array 46 and the various parts of the tubing array 48 are finned together by the utilization of a large number of thin fin members 102. FIG. 3 illustrates how the tubing array 68 associated with heat can be finned together with the Freon-carrying tubes, whereas FIG. 4 makes clear that the fins of the tubing array associated with heat can be finned separate from the evaporator coils.

Figure 6:
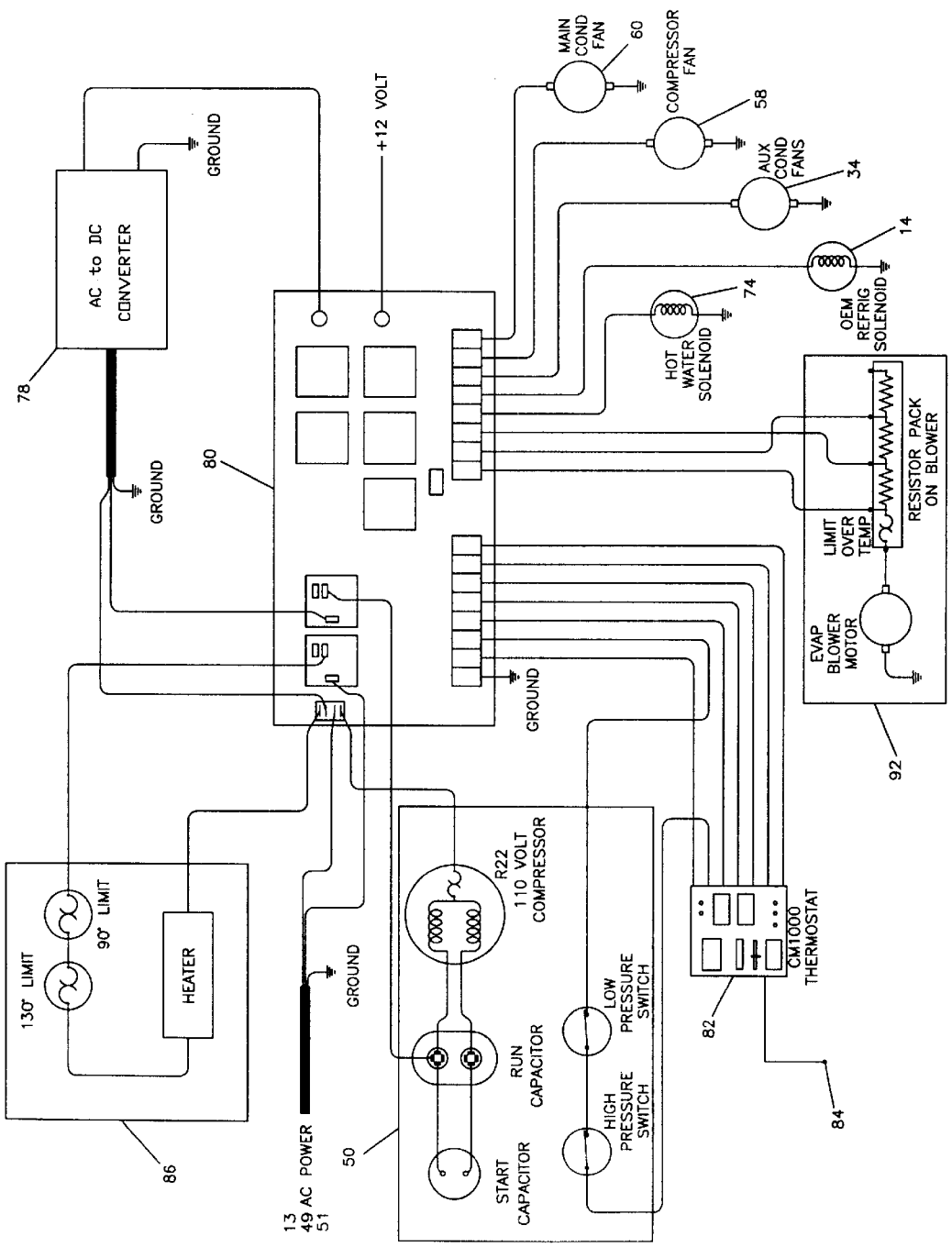
FIG. 6 is an overall wiring diagram illustrating the significant electrical components utilized in accordance with an exemplary version of my novel air conditioning arrangement.

Although this invention is primarily concerned with the distribution unit 88 depicted in FIG. 2, and with particular regard to the novel evaporator unit 44, reference is now made to FIG. 6, wherein a novel electronic control system is illustrated in conjunction with the previously-mentioned electrical control box 80 and the thermostat 82. More particularly, it is to be pointed out that I utilize a single user interface or thermostat for controlling the two separate air conditioning systems forming an intrinsic part of this invention. In many instances the selection of whether the vehicle's 12 volt system or the 110 volt system is employed is automatic, and accomplished without intervention by the operator.

With regard to further detail appearing in FIG. 6, the digital thermostat 82, designated CM-1000, incorporates a digital display of the ambient temperature of the environment being controlled. A user selectable mode switch makes it possible to switch between, heating or cooling. Also provided is a fan speed switch for selecting high, medium or low fan speed and a slide control for selecting the desired set-point temperature.

With regard to FIG. 6, it is to be observed that the system I utilize consists of a model CM-110V micro-computer controlled interface board.

With regard to an example of the operation of my system when the thermostat 82 calls for heat, the CM-110V interface board first checks to see which of two heating systems is available. If the vehicle is connected to ac shore power, the ac powered electric resistance heat strip 86 forming a part of the distribution unit 88 is turned on; note FIG. 2. Before this heater is turned on, however, the micro-computer on the CM-110V interface board first looks at the current signature of the blower motor 92, or in other words, to the signal being sent. If the current signature of the blower motor is not within the expected parameters, the electric heat strip 86 will not be activated. The speed of the blower motor 92 will also be increased to medium if it was set too low on the CM-1000 user interface.

When heat is no longer required, the electric heat strip 86 will be de-activated. The blower motor 92 will continue to operate at medium speed for 30 seconds before being allowed to return to low (if so selected on the CM-1000 user interface). It is to be understood that power for the blower motor will be routed from the ac/dc converter 78 when the vehicle is connected to 110 volt shore power.

When the CM-1000 user interface (thermostat 82) calls for heat, and the vehicle's engine is running and hot water is available from the radiator of the engine, the interface will actuate the hot water solenoid or control valve 74, allowing hot water from the vehicle engine to circulate through the previously-mentioned hot water heater core 68 forming a part of the distribution unit 88. The blower motor 92 will be increased to medium'speed if it was set at low on the CM-1000 user interface. Power to the blower motor will of course be routed from the vehicle's 12 volt power system if the vehicle is not connected to shore power.

When, on the other hand, the CM-1000 user interface (thermostat 82) calls for cooling, and the vehicle is connected to shore power, the interface board will route power to the condenser fans 34 and 60, the compressor fan 58, and blower motor 92 from the ac/dc converter 78. If the R-22 refrigerant compressor 50 has not been running in the past four minutes, it will be turned on. If the R-22 compressor 50 has been run in the past four minutes, it will not be turned on, but held off until the compressor lockout register in the micro-computer determines that four minutes have elapsed. At this time, power to the compressor 50 will be routed from the shore power connection.

When the CM-1000 user interface (thermostat 82) calls for cooling and the vehicle's engine is running, the interface board will turn on the blower motor 92, the auxiliary condenser fans (if vehicle is so equipped) as well as the main condenser fan (if the vehicle is equipped with a combined dual condenser coil assembly).

Power to the auxiliary condenser fan 34 (if used) will be routed from the vehicle's 12 volt power system. If the vehicle is not connected to shore power, power to the blower motor 92 and main condenser fans, if a combined dual condenser coil assembly is used, will be routed from the vehicle's 12 volt power system. If the vehicle is connected to shore power, power to the blower motor 92 and main condenser fan 60 will be routed from the ac/dc converter 78. The auxiliary condenser fans (if used) will still be powered from the vehicle's 12 volt power system even if the vehicle is connected to shore power as long as the vehicle's engine is running.

In addition to the actions listed above, when cooling is required and the vehicle's engine is running, the interface board will energize the 12 volt refrigerant solenoid relay to cause power to be applied to the compressor 14. The interface board will also actuate the R-134A compressor's clutch mounted on the vehicle's engine.

Note that when the vehicle is connected to shore power and the engine 12 is running, both H.V.A.C. systems will be utilized. Power to the blower motor 92, main condenser fans 34 and 60, R-22 compressor fan 58 and CM-1000 user interface will be routed from the ac/dc converter 78. Power to the auxiliary condenser fan (if used), R-134A refrigerant solenoid, and R-134A compressor clutch will be routed from the vehicle's 12 volt power system. Power to the R-22 compressor 50 and electric resistance heater strip 86 will be routed directly from the shore power connection.

Other significant details of my invention will be apparent to those skilled in this art, and I am not to be limited to the details set forth herein except as required by the scope of the appended Patent Claims.

I claim:

1. An air conditioning arrangement for an emergency vehicle or the like including an evaporator unit comprising closely spaced first and second tubing arrays, with each array being operably associated with a respective refrigerant compressor, the tubing of each array being formed into coils involving a number of essentially parallel tubing runs connected by curved end members, substantial portions of said tubing being provided with fins, and blower means positioned to cause air to be pulled across the tubing of said first and second tubing arrays and between said fin members, and a third tubing array operatively positioned alongside said evaporator unit containing said first and second tubing arrays, said third tubing array being adapted to carry a heated liquid on occasion, and an engine-driven compressor operatively mounted on the vehicle causing refrigerant to flow actively through said first tubing array, with water from the radiator of the engine that powers the vehicle being provided on an as-needed basis to said third tubing array, to be utilized in the event the temperature in the interior of the vehicle needs to be raised.

2. The air conditioning arrangement for an emergency vehicle or the like as defined in claim 1 in which said third tubing array is essentially integral with said first and second tubing arrays, and shares fins common to said first and second tubing arrays.

3. The air conditioning arrangement for an emergency vehicle or the like as defined in claim 1 in which a second refrigerant compressor, powered by alternating current, is mounted on the vehicle, with said second compressor serving on occasion to cause refrigerant to flow actively through said second tubing array.

4. A combinational air conditioning arrangement for an emergency vehicle or the like having an evaporator supporting means, an air conditioner evaporator unit mounted upon the supporting means, said evaporator unit involving first and second tubing arrays, with each array being operably associated with a respective compressor, the tubing of each array being formed into coils involving a number of essentially parallel tubing runs connected by curved end members, said first and second tubing arrays being interconnected by a multiplicity of fin members of thin, thermally conductive material, and blower means positioned to cause air to be pulled across the tubing of said first and second tubing arrays and between said fin members, and a third tubing array operatively positioned alongside said evaporator containing said first and second tubing arrays, said third tubing array being adapted to carry a heated liquid on occasion, and an engine-driven compressor operatively mounted on the vehicle causing refrigerant to flow actively through said first tubing array, with water from the radiator of the engine that powers the vehicle being provided on an as-needed basis to said third tubing array, to be utilized in the event the temperature in the interior of the vehicle needs to be raised.

5. The combinational air conditioning arrangement for an emergency vehicle or the like as defined in claim 4 in which said third tubing array is essentially integral with said first and second tubing arrays, and shares fins common to said first and second tubing arrays.

6. The combinational air conditioning arrangement for an emergency vehicle or the like as defined in claim 4 in which a second refrigerant compressor, operative on alternating current, is mounted on the vehicle, with said second compressor serving on occasion to cause refrigerant to flow actively through said second tubing array.

7. A novel combinational air conditioning arrangement for an emergency vehicle or the like having an evaporator supporting means, an air conditioner evaporator unit mounted upon the supporting means, said evaporator unit involving first and second tubing arrays, with each array being operably associated with a respective refrigerant compressor, a first of said compressors being an engine-driven compressor operatively mounted on the vehicle for causing refrigerant to flow actively through said first tubing array, the tubing of each array being formed into coils involving a number of essentially parallel tubing runs connected by curved end members, with the plane of said first tubing array being substantially parallel to the plane of said second tubing array, each of said tubing arrays having a multiplicity of fins thereon, made of thin, thermally conductive material, a first type of Freon being utilized in said first tubing array, and a second type of Freon being utilized in said second tubing array, blower means positioned to cause air to be pulled across the tubing of said first and second tubing arrays and between the fins thereon, said blower means being operative on low voltage and providing a flow of air over both of said tubing arrays at such time as refrigerant is actively flowing through at least one of said tubing arrays, and a single thermostat for controlling the two separate air conditioning systems represented by said first and second tubing arrays and their related components.

8. The novel combinational air conditioning arrangement for an emergency vehicle or the like as defined in claim 7 in which said first and second tubing arrays normally operate alternately, with refrigerant actively flowing through only one of said tubing arrays at a time.

9. The novel combinational air conditioning arrangement for an emergency vehicle or the like as defined in claim 7 in which said first and second tubing arrays are interconnected by a multiplicity of fin members of thin, thermally conductive material.

10. A novel combinational air conditioning arrangement for an emergency vehicle or the like having an evaporator supporting means, an air conditioner evaporator unit mounted upon the supporting means, said evaporator unit involving first and second tubing arrays, with each array being operably associated with a respective refrigerant compressor, a first of said compressors being an engine-driven compressor operatively mounted on the vehicle for causing refrigerant to flow actively through said first tubing array, the tubing of each array being formed into coils involving a number of essentially parallel tubing runs connected by curved end members, with the plane of said first tubing array being substantially parallel to the plane of said second tubing array, each of said tubing arrays having a multiplicity of fins thereon, made of thin, thermally conductive material, a first type of Freon being utilized in said first tubing array, and a second type of Freon being utilized in said second tubing array, and blower means positioned to cause air to be pulled across the tubing of said first and second tubing arrays and between the fins thereon, said blower means being operative on low voltage and providing a flow of air over both of said tubing arrays at such time as refrigerant is actively flowing through at least one of said tubing arrays, said first and second tubing arrays being interconnected by a multiplicity of fin members of thin, thermally conductive material, and a third tubing array residing in an essentially integral relationship with said first and second tubing arrays, sharing fins common to said first and second tubing arrays.

11. The novel combinational air conditioning arrangement for an emergency vehicle or the like as defined in claim 10 in which said third tubing array is adapted to carry a heated liquid on occasion, with water from the radiator of the engine that powers the vehicle being provided on an as-needed basis to said third tubing array, to be utilized in the event the temperature in the interior of the vehicle needs to be raised.

12. The novel combinational air conditioning arrangement for an emergency vehicle or the like as defined in claim 7 in which a second refrigerant compressor, powered by alternating current, is mounted on the vehicle, with said second compressor serving on occasion to cause refrigerant to flow actively through said second tubing array.

13. The novel combinational air conditioning arrangement for an emergency vehicle or the like as defined in claim 12 in which an individual condenser is operatively associated with each of said first and second tubing arrays, with said condensers being mounted at separated locations on the vehicle, with a separate cooling fan provided for the cooling of each of said condensers.

14. The novel combinational air conditioning arrangement for an emergency vehicle or the like as defined in claim 13 in which means are provided for selectively operating said first and second compressors at the same time, with simultaneous operation of the first and second compressors, condensers and respective tubing arrays bringing about increased cooling to the interior of the vehicle.

15. A novel combinational air conditioning arrangement for an emergency vehicle or the like having an evaporator supporting means, an air conditioner evaporator unit mounted upon the supporting means, said evaporator unit involving first and second tubing arrays, with each array being operably associated with a respective refrigerant compressor, with said first compressor, operatively associated with said first tubing array being installed at a location in the vehicle spaced from the location of the compressor associated with said second tubing array, the tubing of said first and second arrays being formed into coils involving a number of essentially parallel tubing runs connected by curved end members, with the plane of said first tubing array being substantially parallel to the plane of said second tubing array, each of said first and second tubing arrays being equipped with a multiplicity of fin members of thin, thermally conductive material, with a first type of Freon being utilized in said first tubing array, and a second type of Freon is utilized in said second tubing array, blower means positioned to cause air to be pulled across the tubing of said first and second tubing arrays and between said fin members, and a single thermostat for controlling the two separate air conditioning systems represented by said first and second tubing arrays and their related components.

16. The novel combinational air conditioning arrangement for an emergency vehicle or the like as defined in claim 15 in which a third tubing array resides in an essentially integral relationship with said first and second tubing arrays, and shares fins in common with said first and second tubing arrays.

17. The novel combinational air conditioning arrangement for an emergency vehicle or the like as defined in claim 16 in which said third tubing array is adapted to carry a heated liquid on occasion, with water from the radiator of the engine that powers the vehicle being provided on an as-needed basis to said third tubing array, to be utilized in the event the temperature in the interior of the vehicle needs to be raised.

18. The novel combinational air conditioning arrangement for an emergency vehicle or the like as defined in claim 15 in which said first refrigerant compressor, operatively associated with said first tubing array, is driven in rotation by the engine of the vehicle, and the second refrigerant compressor, mounted on the vehicle and operatively associated with said second tubing array, is powered by alternating current, with said second compressor serving on occasion to cause refrigerant to flow actively through said second tubing array.

19. The novel combinational air conditioning arrangement for an emergency vehicle or the like as defined in claim 18 in which an individual condenser is operatively associated with each of said first and second tubing arrays, with said condensers being mounted at separated locations on the vehicle, and with a separate cooling fan provided for the cooling of each of said condensers.

20. The novel combinational air conditioning arrangement for an emergency vehicle or the like as defined in claim 19 in which said first and second tubing arrays and their respective components normally operate alternately, with refrigerant actively flowing through only one of said tubing arrays at a time.

21. The novel combinational air conditioning arrangement for an emergency vehicle or the like as defined in claim 19 in which means are provided for selectively operating said first and second compressors at the same time, with simultaneous operation of the first and second compressors bringing about the flow of refrigerant through both said first and said second tubing arrays, thus to bring about increased cooling of the interior of the vehicle.

* * * * *